(12) United States Patent
Franks

(10) Patent No.: US 12,157,605 B1
(45) Date of Patent: Dec. 3, 2024

(54) STACKABLE FLUID CONTAINERS WITH ATTACHABLE WHEEL ASSEMBLY

(71) Applicant: Michael Franks, Minneapolis, MN (US)

(72) Inventor: Michael Franks, Minneapolis, MN (US)

( * ) Notice: Subject to any disclaimer, the term of this patent is extended or adjusted under 35 U.S.C. 154(b) by 308 days.

(21) Appl. No.: 17/580,924

(22) Filed: Jan. 21, 2022

Related U.S. Application Data

(60) Provisional application No. 63/139,840, filed on Jan. 21, 2021.

(51) Int. Cl.
| | | |
|---|---|---|
| *B65D 21/02* | (2006.01) | |
| *B62B 1/12* | (2006.01) | |
| *B62B 3/02* | (2006.01) | |
| *B62B 3/04* | (2006.01) | |
| *B65D 25/28* | (2006.01) | |
| *B65D 47/12* | (2006.01) | |

(52) U.S. Cl.
CPC .............. *B65D 21/023* (2013.01); *B62B 1/12* (2013.01); *B62B 3/02* (2013.01); *B62B 3/04* (2013.01); *B65D 25/2826* (2013.01); *B65D 25/2888* (2013.01); *B65D 25/2894* (2013.01); *B65D 47/122* (2013.01)

(58) Field of Classification Search
CPC ...... B65D 21/0209; B65D 21/023; B62B 3/04
See application file for complete search history.

(56) References Cited

U.S. PATENT DOCUMENTS

| | | | | |
|---|---|---|---|---|
| 3,369,688 | A * | 2/1968 | Dike | B65D 21/0231 215/10 |
| 4,412,633 | A | 11/1983 | Guerrazzi et al. | |
| 4,541,529 | A * | 9/1985 | Hestehave | B65D 25/2894 206/509 |
| 4,805,793 | A * | 2/1989 | Brandt | B65D 21/0231 206/509 |
| 6,029,858 | A * | 2/2000 | Srokose | B65D 1/18 222/468 |
| 6,588,612 | B1 * | 7/2003 | Dorn | B65D 21/0231 220/23.6 |
| 7,163,034 | B2 | 1/2007 | Franks | |
| 7,699,171 | B2 | 4/2010 | Rivera et al. | |
| 9,067,614 | B2 | 6/2015 | Vanderberg et al. | |
| 10,252,834 | B2 * | 4/2019 | Yourist | B65D 21/0215 |
| 11,034,484 | B2 * | 6/2021 | Pedmo | B65D 1/0292 |
| 11,383,880 | B2 * | 7/2022 | Nenna | B29C 45/26 |
| 2011/0204051 | A1 * | 8/2011 | Pawl | B65D 21/0231 29/428 |
| 2014/0061150 | A1 * | 3/2014 | Park | B65D 21/0204 215/44 |
| 2015/0035259 | A1 * | 2/2015 | Umbro | B62B 5/065 280/654 |
| 2022/0274736 | A1 * | 9/2022 | Aubin | B65D 21/0222 |

\* cited by examiner

*Primary Examiner* — Brian L Swenson
(74) *Attorney, Agent, or Firm* — Bradley J. Thorson; DeWitt LLP

(57) ABSTRACT

Difficulties associated with transferring fluids are overcome by providing jugs for such containers that are stackable and attachable to wheel assemblies and a pole that can serve as a handle for pulling or pushing the containers.

18 Claims, 8 Drawing Sheets

STACKABLE FLUID CONTAINERS WITH ATTACHABLE WHEEL ASSEMBLY

CROSS-REFERENCED TO RELATED APPLICATIONS

This application is a non-provisional application of Application No. 63/139,840, filed Jan. 21, 2021, and claims priority from that application which is also deemed incorporated by reference in its entirety in this application.

STATEMENT REGARDING FEDERALLY SPONSORED RESEARCH OR DEVELOPMENT

Not applicable

BACKGROUND OF THE INVENTION

I. Field of the Invention

The present invention relates generally to fluid transport containers, and more particularly, to the design of liquid containers having handles and pour spouts, yet are stackable, one atop the other and which provide for the attachment of wheels on a bottom-most container in the stack for ease in transporting the stacked container.

II. Discussion of the Prior Art

U.S. Pat. No. 7,163,034 assigned to the present applicant describes a system for transporting fluids, such as gasoline, from a supply source to a utilization device in which multi-gallon jugs can be arranged, side-by-side on a two-wheel dolly and where a hand-operated pump is attachable to the jug's filling spout to facilitate dispensing the contents from the jugs. The present invention is similar in purpose to our earlier product, but the jugs are molded from a suitable plastic such that a vertical stacking of plural ones of the jugs can be realized in spite of the presence of a capable spout and carrying handle formed on a top surface of the container's body.

Moreover, the bottom of the jugs includes a molded-in structure that facilitates the attachment of a two-wheel axle assembly and either an optional skid plate or a caster wheel assembly to allow easy transport of filled and stacked containers.

SUMMARY OF THE INVENTION

In accordance with the present invention, there is provided a fluid transfer apparatus comprising a molded plastic container, such as a jug, having a top, a bottom and four mutually perpendicular side surfaces. Without limitation, the jugs may typically have anywhere from a five-gallon capacity on up, such that when filled with a liquid, such as gasoline, may weigh from 30 pounds to two hundred pounds. The top is shaped with a horizontal shelf-like portion leading from the jug's rear side to a truncated pyramidal projection having a threaded pour spout and a screw-on cap atop the pyramidal projection. An integrally molded somewhat in the form of an inverted J-shape forms a closed loop extending from the horizontal shelf-like portion to the truncated surface of the pyramidal projection.

The bottom of the jug is molded so as to have cavities formed therein for receiving an arcuate portion of the inverted J-shaped handle and a capped pour spout of a vertically adjacent underlying one of the jugs.

Also, integrally molded in the bottom wall of the jug adjacent to the juncture of the bottom wall with a rear side wall of the jug is a recess for a U-shaped clip that is affixed to the bottom of an elongate handle that extends upward adjacent the rear walls of one or more jugs. Extending through a bottom portion of the elongate handle is a transversely extending axle on which a pair of wheels are journaled for rotation. The elongate handle prevents shifting of the jugs when the inverted J-shaped handles of the jug are releasably strapped to the molded plastic handle of a lowermost jug in the stack.

There is also formed in the bottom wall of the jug proximate its front wall a recess that accommodates an optional caster wheel assembly that allows the load to be wheeled about without having to tip the elongate handle away from the vertical.

BRIEF DESCRIPTION OF THE DRAWINGS

The foregoing features, objects and advantages of the invention will become apparent to those skilled in the art from the following detailed description of the preferred embodiment, especially when considered in conjunction with the accompanying drawings in which like numerals in the several views refer to corresponding parts.

DESCRIPTION OF THE PREFERRED EMBODIMENT

Figure 1:
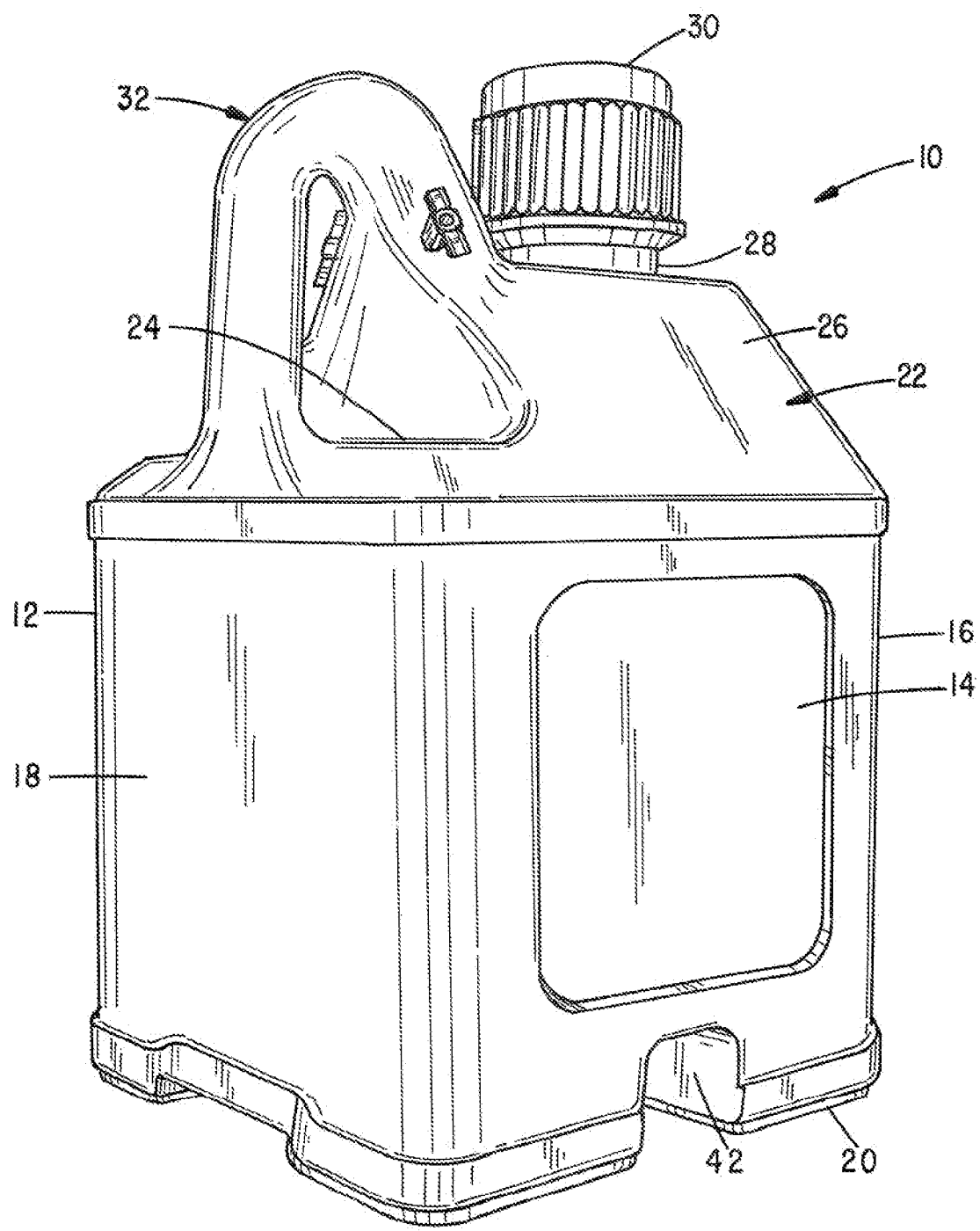
FIG. 1 is a perspective view of a container or jug of the present invention.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down". "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Referring first to FIG. 1, there is indicated generally by numeral 10 a molded plastic container having four mutually perpendicular side walls including a left side 12, a right side 14, a front wall 16 and a rear wall 18. These four walls extend between a bottom wall 20 and a container top 22.

The container top 22 includes a horizontal portion 24 extending from the top edge of the rear wall 18 to the base of a truncated pyramidal section 26. Projecting upward from the top of the truncated pyramid section 26 is a threaded pour spout 28 on which a screw-on cap 30 is installed.

Figure 2:
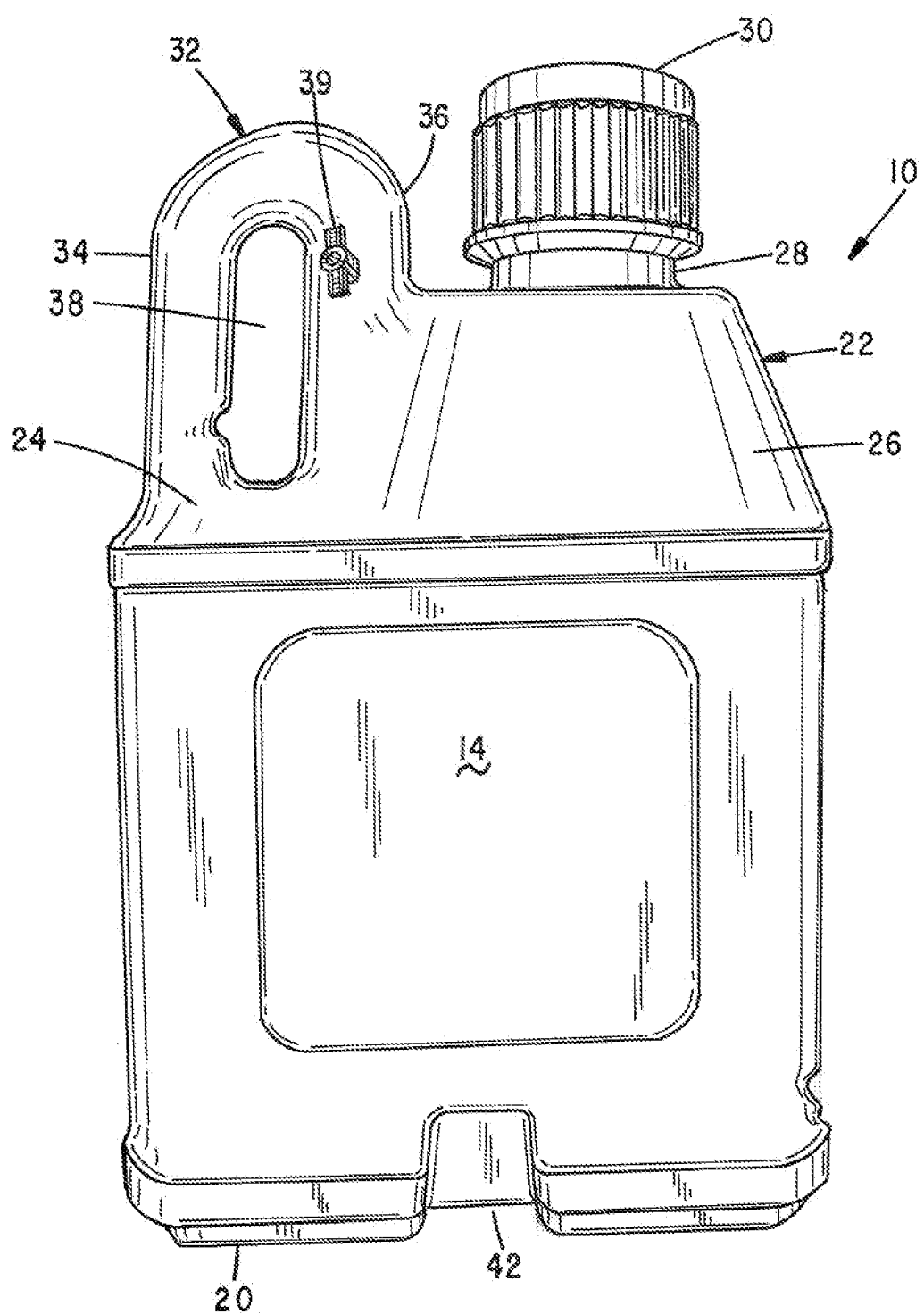
FIG. 2 is a right side view thereof.

Referring to FIG. 2, the jug 10 also includes an integrally molded handle 32 having an inverted J-shape where the longer leg 34 of the J-shape has one end integrally joined to the horizontal portion 24 and its shorter leg 36 integrally joined to the top of the truncated pyramid 26 thereby providing an opening 38 for a user's grasp. Formed through the jug proximate the junction of the leg 36 with the top of the truncated pyramid portion is a butterfly valve 39 which when opened permits air to enter the jug as its liquid is dispensed.

Figure 4A:
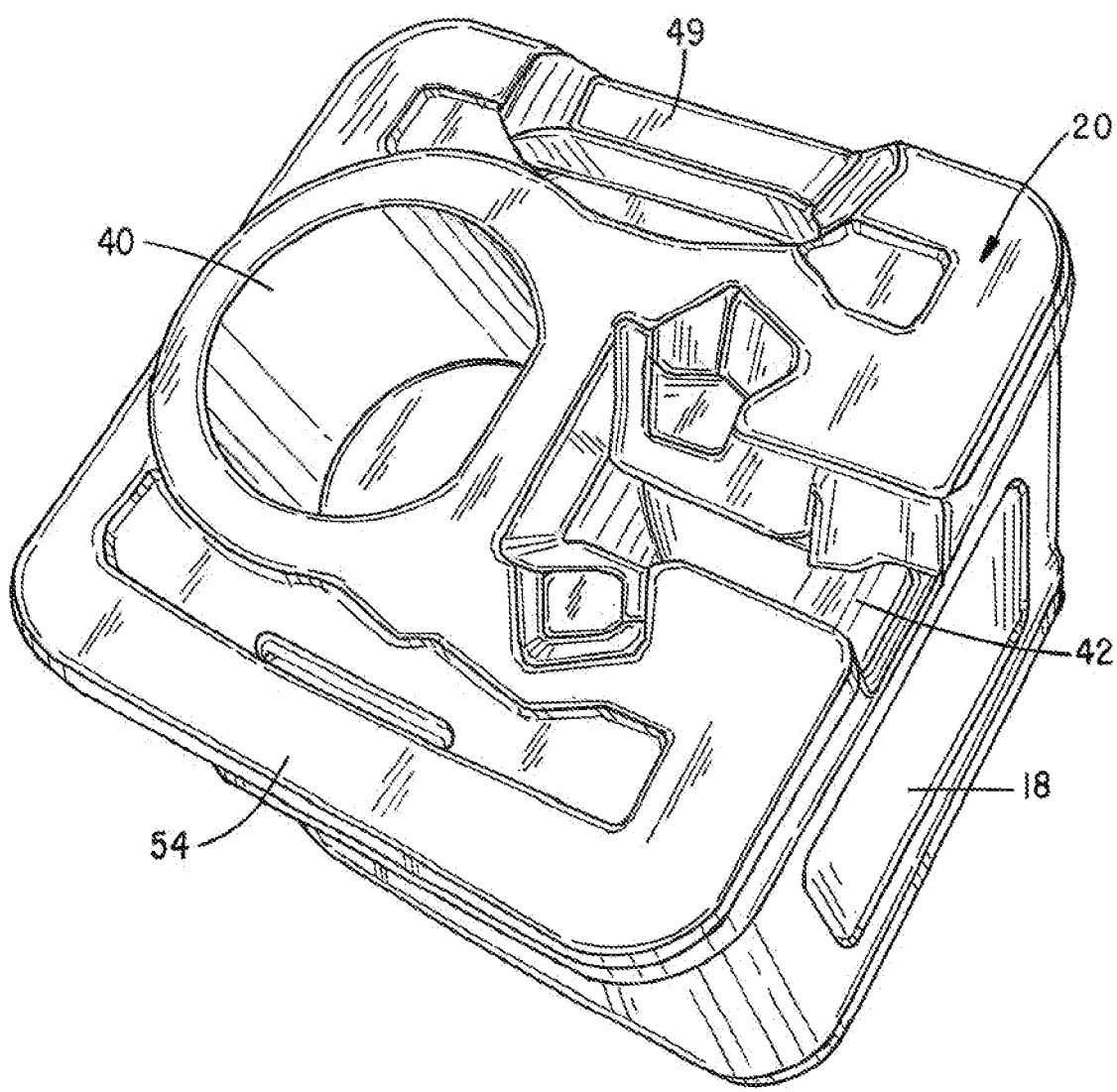
FIG. 4A is a view of a base portion of the jug.
Figure 4B:
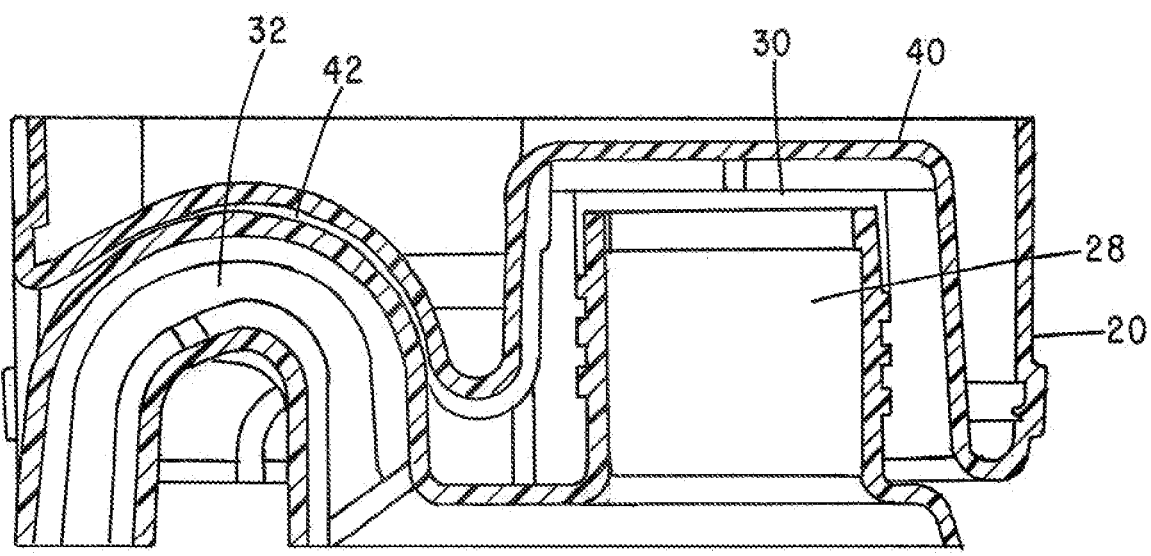
FIG. 4B is a cross-sectional view showing two jugs that are stacked.
Figure 5:
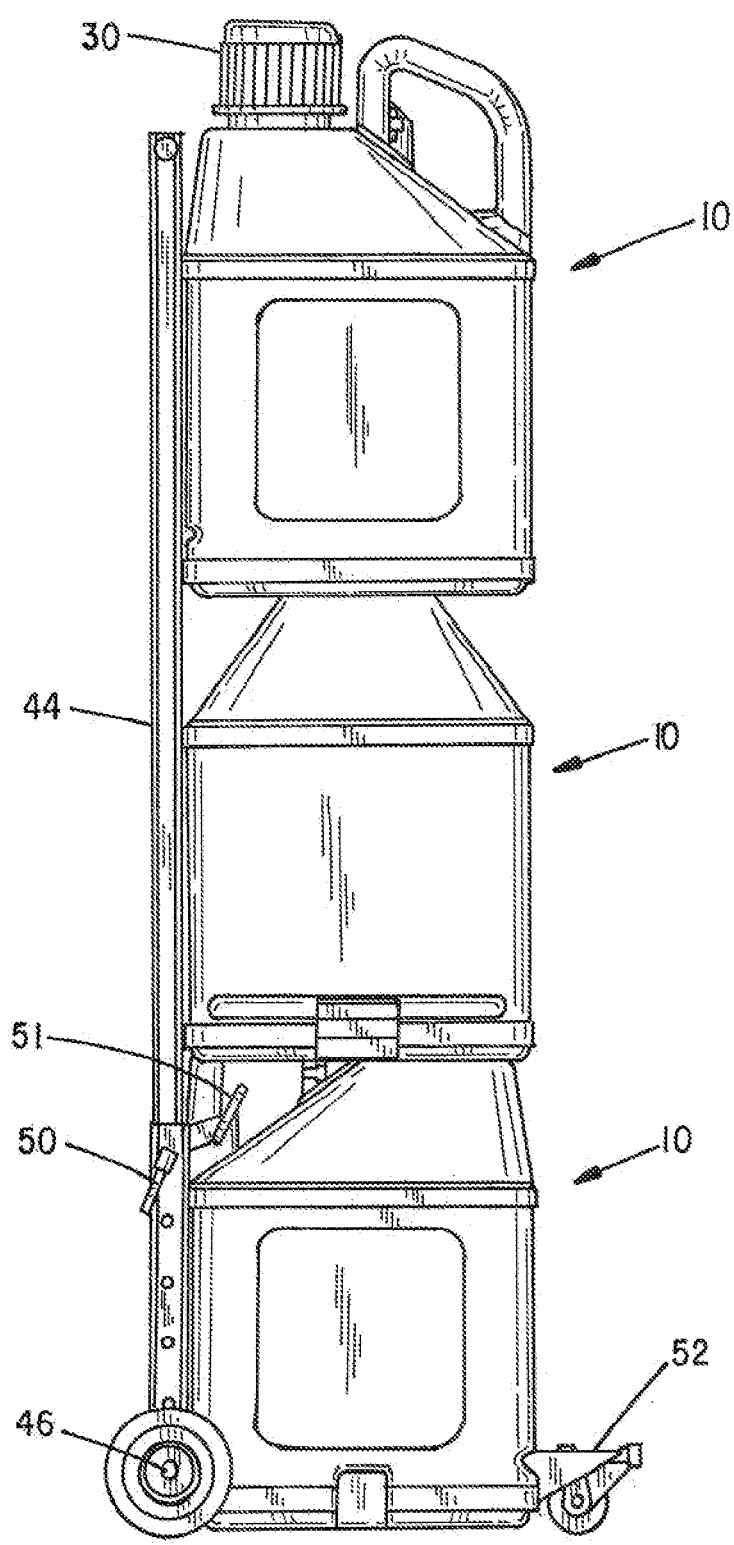
FIG. 5 shows a stack of three jugs mounted on a combination of an elongate metal handle that is joined at a bottom end to an axle and wheel assembly.

FIG. 4A shows the bottom portion 20 of a jug and FIG. 4B is a partial sectional view that showing the bottom portion as being placed atop a top portion of an underlaying jug or container. Here, it can be seen that the bottom 20 of each such jug includes a somewhat cylindrical recess 40 sized to receive a capped pour spout 28 of an underlaying jug. The bottom portion 20 further includes an arcuate recess 42 into which a portion of the handle 32 is adapted to fit when two jugs are stacked, one atop the other, as seen in FIG. 5.

Figure 6:
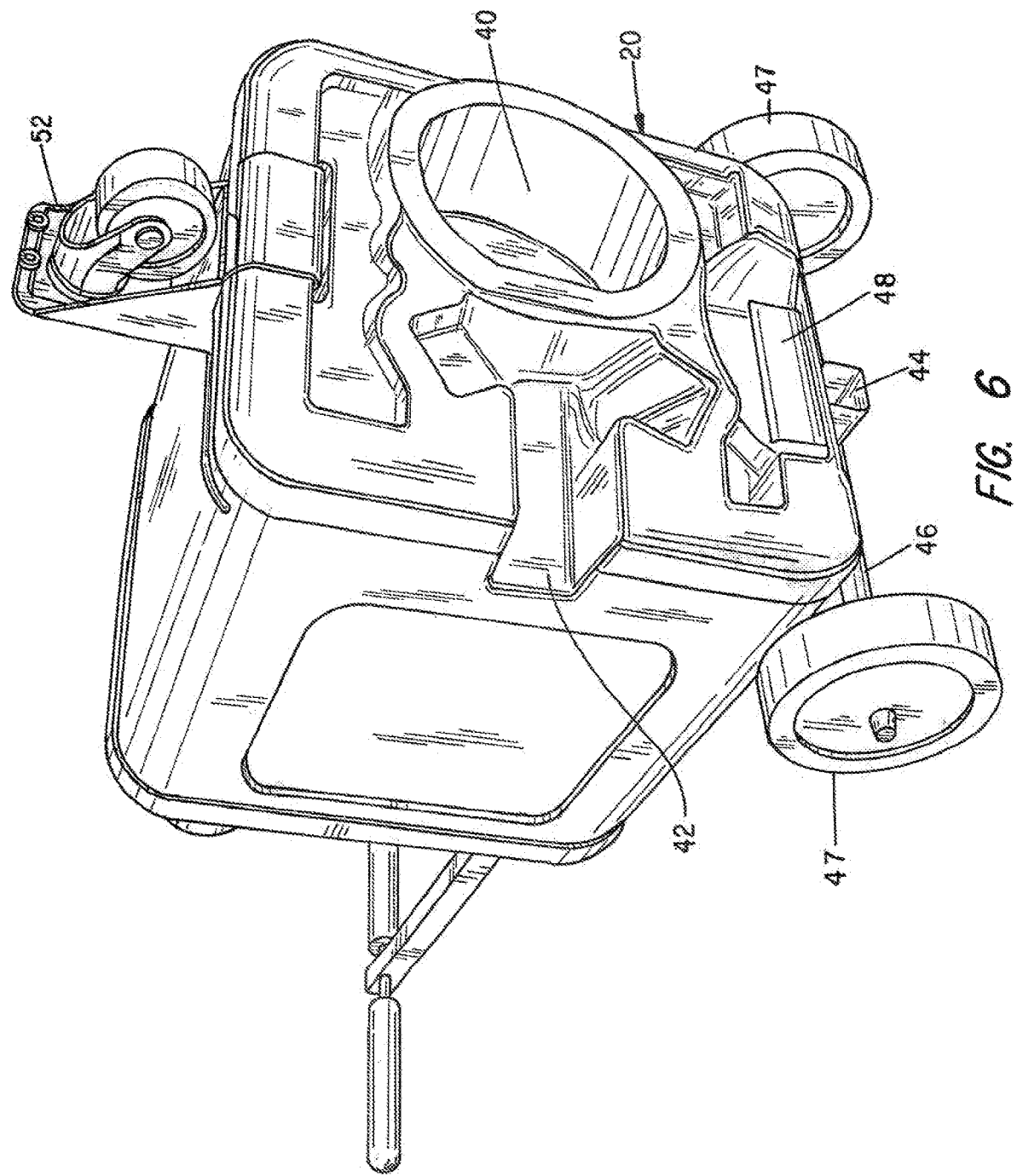
FIG. 6 is a bottom view of a lowermost jug in a stack showing connections of the wheel/handle assembly to the jug and a connection of an optional caster wheel assembly thereto.
Figure 7:
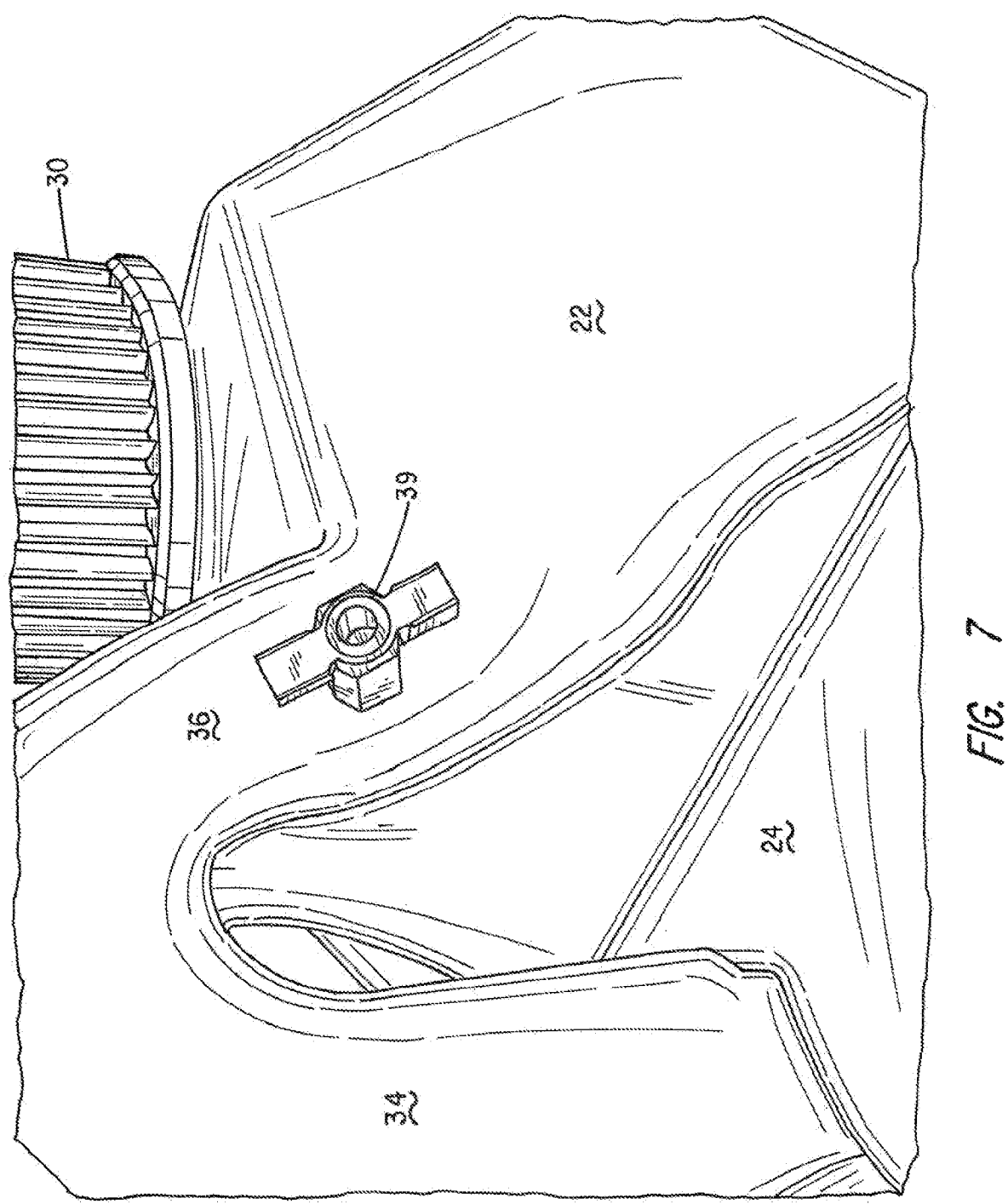
FIG. 7 is a detailed view showing a butterfly vent valve on the handle portion of the jug for admitting air into the jug as its contents are being poured and/or pumped out.

Seen in Figure S is an elongate tubular pole 44 of rectangular cross-section that functions not only to stabilize the jugs in a stacked configuration as shown, but also functions as a handle for a wheel assembly readily attachable to a lowermost jug in the stack. More particularly, as seen in FIG. 6, an axle 46 passes through aligned apertures in the pole 44 and mounted at each end of the axle is a wheel 47 that is journaled for rotation. Also fastened to the bottom end of the pole 44 is a U-shaped clip 48 that engages a boss 49 integrally formed in the bottom of the jug directly proximate a rear wall thereof. As seen in FIG. 5, a further clip 50 is used to releasably couple the pole 44 to the molded handle of the lowermost jug. Another pin 51 secures the handle pole to the container, directly in front of the clip 50. With this arrangement, a user may tip the pole 44 counterclockwise when viewed in FIG. 5 so that the stack of containers is supported on the wheels 47 in a manner similar to a two-wheeled dolly.

Figure 3:
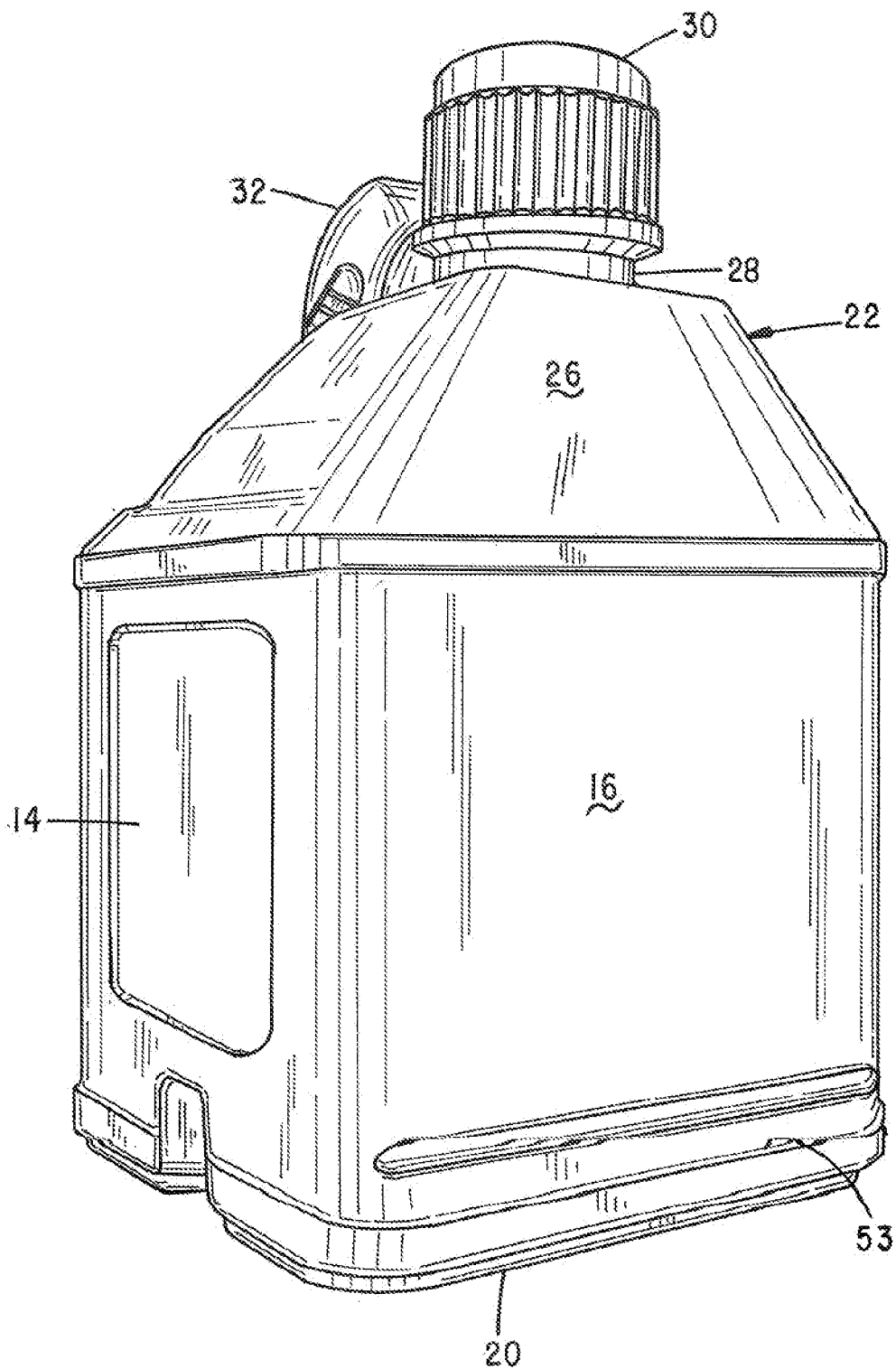
FIG. 3 is a front perspective view thereof.

Also seen in FIG. 6 is an optional caster wheel assembly 52 that is adapted to clip onto the bottom lip 53 (FIG. 3) including a flat bottom portion 54 (FIG. 4A) of the container proximate its front wall 16. It, along with the wheels 46, allows a user to push the stacked containers on a floor surface without having to tilt the stack.

When a caster wheel assembly is not being used, it is adapted to be replaced with a metal C-clip skid plate that snaps onto the bottom lip 53 that prevents the plastic bottom edge of the container from scuffing and wearing as the cart is being moved about.

When a container is unloaded from the stack on a cart assembly, the cap 30 may be removed and replaced with the cap on a crank-operated pump of the type described in U.S. Pat. No. 7,163,034 and used to withdraw the liquid contents of the container.

Various modifications may be made without deviating from the invention. For example, the bottom of the U-shaped clip 48 that engages a boss 49 could include an extension that protrudes beyond the U-shaped clip 48 and supports the bottom of the container to help stabilize a container or containers, specifically if the container has a wider base. This extension could also comprise a flat load plate that extends out with holes in the load plate at the same location of the U-shaped clip 48. These holes could mate with a wire form U-shaped piece. The wire form U-shaped piece would attach at the same location as the current U-shaped clip and would potentially be affixed to the plate or attached separately.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

The invention claimed is:

1. A fluid transfer apparatus comprising a first container including a front wall, a rear wall, a pair of side walls, a top, a bottom, a threaded pour spout on which a screw cap is installed extending from the top, and a curved handle extending from the top, said bottom comprising a lip proximate to the front wall, a boss proximate to the rear wall, a first clip adapted to engage the boss, a cylindrical recess adapted to receive a capped pour spout of an underlying container and an arcuate recess adapted to receive at least a portion of a handle of an underlying container.

2. The fluid transfer apparatus of claim 1 comprising a second container identical in configuration to the first container.

3. The fluid transfer apparatus of claim 2 wherein the first and second containers are stacked with the threaded pour spout on which a screw cap is installed of the first container received within the cylindrical recess of the second container and a portion of the handle of the first container received in the arcuate recess of the second container.

4. The fluid transfer apparatus of claim 1 wherein the first clip is coupled to an axle on which a pair of wheels is mounted.

5. The fluid transfer apparatus of claim 1 wherein the first clip is attached to a pole adapted to extend upwardly from the clip adjacent the back wall of the first container.

6. The fluid transfer apparatus of claim 5 a second clip adapted to couple the pole to the curved handle extending from the top of the first container.

7. The fluid transfer apparatus of claim 1 further comprising a first clip and a second clip, wherein the first clip is adapted to engage the boss, is coupled to an axle on which a pair of wheels is mounted, and is attached to a pole adapted to extend upwardly from the clip adjacent the back wall of the first container, and wherein the second clip is adapted to couple the pole to the curved handle extending from the top of the first container.

8. The fluid transfer apparatus of claim 7 further comprising a caster wheel assembly comprising a third clip adapted to be coupled to the lip proximate to the front wall of the first container.

9. The fluid transfer apparatus of claim 1 further comprising a skid plate adapted to be coupled to the bottom lip.

10. A fluid transfer apparatus comprising a plurality of containers, each of said plurality of containers including a front wall, a rear wall, a pair of side walls, a top, a bottom, a threaded pour spout on which a screw cap is installed extending from the top, and a curved handle extending from the top, said bottom comprising a lip proximate to the front wall, a boss proximate to the rear wall, a first clip adapted to engage the boss of one of said plurality of containers, a cylindrical recess adapted to receive a capped pour spout of an underlying container, and an arcuate recess adapted to receive at least a portion of a handle of an underlying container.

11. The fluid transfer apparatus of claim 10 wherein a first container and a second container of said plurality of containers are stacked with the threaded pour spout on which a screw cap is installed of the first container received within the cylindrical recess of the second container and a portion of the handle of the first container received in the arcuate recess of the second container.

12. The fluid transfer apparatus of claim 10 wherein the first clip is coupled to an axle on which a pair of wheels is mounted.

13. The fluid transfer apparatus of claim 10 wherein the first clip is attached to a pole adapted to extend upwardly from the clip adjacent the back wall of said one of said plurality of containers.

14. The fluid transfer apparatus of claim 13 further comprising a second clip adapted to couple the pole and to the curved handle extending from the top of said one of said plurality of containers.

15. The fluid transfer apparatus of claim 10 further comprising a first clip and a second clip, wherein the first clip is adapted to engage the boss of one of said plurality of containers, is coupled to an axle on which a pair of wheels is mounted, and is attached to a pole adapted to extend upwardly from the clip adjacent the back wall of said one of said plurality of containers, and wherein the second clip is adapted to couple the pole to the curved handle extending from the top of said one of said plurality of containers.

16. The fluid transfer apparatus of claim 15 further comprising a caster wheel assembly comprising a third clip adapted to be coupled to the lip proximate to the front wall of said one of said plurality of containers.

17. A fluid transfer apparatus comprising:
(a) a first container and a second container, each of said first and second containers including a front wall, a rear wall, a pair of side walls, a top, a bottom, a threaded pour spout on which a screw cap is installed extending from the top, and a curved handle extending from the top, said bottom comprising a lip proximate to the front wall, a boss proximate to the rear wall, a cylindrical recess adapted to receive a capped pour spout of an underlying container, and an arcuate recess adapted to receive at least a portion of a handle of an underlying container, wherein the first container and the second container are stacked with the threaded pour spout on which a screw cap is installed of the first container received within the cylindrical recess of the second container and a portion of the handle of the first container received in the arcuate recess of the second container;
(b) a first clip, wherein the first clip is adapted to engage the boss of said first container, is coupled to an axle on which a pair of wheels is mounted, and is attached to a pole adapted to extend upwardly from the clip adjacent the back wall of the first container; and
(c) a second clip adapted to couple the pole to the curved handle extending from the top of said first container.

18. The fluid transfer apparatus of claim 17 further comprising a caster wheel assembly comprising a third clip adapted to be coupled to the lip proximate to the front wall of said first container.

\* \* \* \* \*